United States Patent Office 2,835,649
Patented May 20, 1958

2,835,649

STABILIZATION OF AN UNSATURATED POLY-
ESTER WITH A MIXTURE COMPRISING RES-
ORCINOL MONOBENZOATE AND A MONO OR
DIHYDROXY BENZOPHENONE

Albright M. Nicholson, Warrensville Heights, and Stanley
B. Elliott, Bedford, Ohio, assignors to Ferro Chemical
Corporation, Bedford, Ohio, a corporation of Ohio No Drawing. Application March 15, 1957
Serial No. 646,221

5 Claims. (Cl. 260—45.85)

This invention relates to polyester resins and more particularly to a means for inhibiting the deterioration of such resins.

This invention is a continuation-in-part of our application, Serial No. 610,719, dated September 19, 1956, now abandoned.

It is well known to those skilled in the art, plastics having many desirable properties can be prepared from polyesters and suitable plasticizers and other modifying agents. These plasticizers and modifying agents other than the present stabilizers, are well known in the art and form no part of the present invention. It is also well known that polyesters are susceptible to deterioration upon exposure to sunlight or other sources of ultra-violet radiations. The result of such exposure is discoloration, increasing embrittlement and cracking. Thus while polyester compositions have been found quite useful in the manufacture of many articles, they have not been entirely suitable for outdoor use because of this tendency to degrade.

We have found that the addition of small amounts of a stabilizer composed of resorcinol monobenzoate and monohydroxy and dihydroxy derivatives of benzophenone to unsaturated polyester resin compositions strongly inhibits breakdown of the resulting composition by exposure to ultra-violet light.

It is therefore the principal object of this invention to provide a polyester composition which is resistant to degradation by ultra-violet radiation.

A further object of this invention is to provide a high degree of stabilization with a low stabilizer cost.

Other objects will become apparent as the description proceeds.

To the accomplishment of the foregoing and related ends, the invention then comprises the features hereinafter fully described and particularly pointed out in the claims, the following description setting forth in detail certain illustrative embodiments of the invention, these being indicative, however, of but a few of the ways in which the principle of the invention may be employed.

Broadly stated this invention comprises as a composition of matter a stabilizer for inhibiting degradation of unsaturated polyesters by ultra-violet light, said stabilizer consisting essentially of from about 10% to about 90% resorcinol monobenzoate and from about 90% to about 10% of a material selected from the class consisting of monohydroxy and dihydroxy derivatives of benzophenone.

The stabilizers of the present invention are particularly useful in inhibiting the degradation of unsaturated polyester resins. These unsaturated polyesters are the long chain high-molecular weight esters, where the ester grouping is an integral part of the polymer chain and a modifying appendage. Polyesters such as the maleic anhydride esters of various glycols, the fumaric acid, endomethylene tetra-hydrophthalic acid (or anhydride) and the phthalic acid (or anhydride) esters of various glycols are typical examples. These unsaturated polyester resins are a well known and definite group of organic compounds. The text, "Polyesters and Their Applications" by Bjorksten Research Laboratories, 1956, published by Reinhold Publishing Corporation, New York, gives a comprehensive discussion of this class of materials.

As stated above the present stabilizers are useful to prevent degradation of unsaturated polyester resinous composition. "Laminac 4123" which is an ester of phthalic and fumaric acids and propylene glycol in conjunction with styrene equal to one-half the polyester resin present is a typical example of a commercial resin which can be stabilized by the present invention against the degradation effects of ultra-violet light. For the of ease of illustrating the effectiveness of the present stabilizers, "Laminac 4123" is used as the resin. However, it will be understood that the present invention is applicable to all the known commercial unsaturated polyester resins which are too numerous to mention.

It is worthy to note that the basic raw materials in polyester manufacture are dicarboxylic acids and dihydroxy alcohols. If any of the reactants used are unsaturated, the polyesters produced may be unsaturated and are then usually cross-linked with compatible unsaturated monomers.

The most important unsaturated acids used in the manufacture of polyesters are maleic and fumaric acids. Saturated acids used in large volumes are phthalic, terephthalic and adipic acids. The acid anhydrides are often used when available and applicable.

None of the other unsaturated dibasic acids are used in the polyester resin industry in large volume. Generally, no advantages are obtained by their use and the expense of these compounds limits their commercial value.

The alcohols used in large volume in polyester manufacture are dihydroxy alcohols or glycols. This class of compounds is capable of polymer formation through the reaction of both hydroxy groups. A long chain linear compound may be built up by reacting these compounds with dibasic acids. The saturated glycols most generally used are ethylene, propylene, diethylene and dipropylene glycols.

Allyl alcohol, which is unsaturated, has been used in quantity in polyester preparation.

It is possible to make unsaturated polyesters from saturated and unsaturated dibasic acids and some unsaturated glycols.

The composition of matter disclosed in the above broadly stated paragraph produces effects heretofore unattainable in prior art ultra-violet absorbing materials. First, the present stabilizer produces a more prolonged ultra-violet absorption than either of the ingredients alone. This is due to the fact that the benzophenone portion of the stabilizer upon being exposed to ultra-violet light immediately begins to efficiently absorb the ultra-violet radiations, upon continued exposure the resorcinol monobenzoate portion of the composition converts to a more efficient absorber of ultra-violet radiations and by the time the benzophenone portion has begun to lose its effectiveness the resorcinol monobenzoate portion has attained its full absorption properties and thus prolongs the life of the stabilizing effect.

The following experimental data clearly demonstrates this aforegoing effect.

*Example I*

A 0.1% solution of resorcinol monobenzoate in isopropyl alcohol was placed in a DU Beckman spectrophotometer (using a 1 cm. cell) and the percent transmission of ultra-violet light was measured.

A second solution identical with the above was exposed to 1000-watt mercury vapor lamp through a Corex D filter for 22 hours. The sample after exposure was then placed in the spectrophotometer and the percent transmission of ultra-violet light was measured.

Comparison of the absorption characteristics of the resorcinol monobenzoate solutions showed that before irradiation the resorcinol monobenzoate was only able to absorb all ultra-violet radiations up to 290 millimicrons in wavelength and was able to absorb all ultra-violet radiation up to 400 millimicrons in wavelength after irradiation.

*Example II*

A sample of Laminac 4123 (an ester of phthalic and fumaric acids and propylene glycol in conjunction with styrene equal to one-half the polyester resin present) was divided into four equal portions and exposed in an X–1–A accelerated weathering unit.

A. Sample A contained no stabilizer. The optical density of the resin after 300 hours' exposure was 0.31 and after 1000 hours the optical density was 0.38.

B. Sample B contained 1.0% resorcinol monobenzoate as the stabilizing ingredient. After 300 hours in the weathering unit the sample had an optical density of 0.26 and 0.30 after 1000 hours' exposure.

C. Sample C was admixed with 1% 2,4-dihydroxybenzophenone as the stabilizer. After 300 hours' exposure the sample had an optical density of 0.22 and after 1000 hours of exposure the optical density of 0.23.

D. Sample D was stabilized with 1.0% of a 3:1 admixture of resorcinol monobenzoate and 2,4-dihydroxybenzophenone. After 300 hours in the weathering unit the sample had an optical density of 0.19 and after 1000 hours had an optical density of 0.20.

Observation of the foregoing data readily reveals that the admixture of resorcinol monobenzoate and 2,4-dihydroxybenzophenone produced unexpected results. Calculating the optical density from a 1% addition of a 3:1 mixture of samples B and C above would show an optical density of 0.25 after 300 hours and 0.28 after 1000 hours'. However, the actual observed optical densities were 0.19 after 300 hours and 0.20 after 1000 hours. Thus demonstrating a synergism not expected from either stabilizer alone.

Further beneficial effects obtained with the stabilizers of the present invention are, when they are used with the various polyester resins, they offer better stability to heat than when each ingredient is used alone.

As previously stated the benzophenone portion of the present stabilizer comprises the monohydroxy and dihydroxy derivatives of benzophenone. Such materials 2,4-dihydroxybenzophenone, 2-hydroxy-4-methoxybenzophenone, 2,2'-dihydroxybenzophenone, 4,4'-dihydroxybenzophenone are typical examples of such benzophenone derivatives.

By the way of illustration, we give the following examples of making up polyester resins containing the stabilizers of the present invention. It will be understood that these illustrations do not constitute a limitation of our invention. All ingredients in the following examples are expressed in parts by weight.

*Example III*

100.0 parts Laminac 4123 (an ester of phthalic and fumaric acids and propylene glycol in conjunction with styrene equal to one-half the polyester resin present)
0.1 part 2,4-dihydroxybenzophenone
0.4 part resorcinol monobenzoate
1.0 part benzoyl peroxide The ingredients are thoroughly mixed, cast into a mold and heated at about 180° F. for about 30 minutes.

*Example IV*

100.0 parts Laminac 4123
0.1 part 2-hydroxy-4-methoxybenzophenone
0.4 part resorcinol monobenzoate
1.0 part benzoyl peroxide The ingredients are thoroughly mixed, cast into a mold and heated at about 180° F. for about 30 minutes.

*Example V*

100.0 parts Laminac 4123
0.05 part 2,2'-dihydroxybenzophenone
0.4 part resorcinol monobenzoate
1.0 part benzoyl peroxide The ingredients are thoroughly mixed, cast into a mold and heated at about 180° F. for about 30 minutes.

*Example VI*

100.0 parts Laminac 4123
0.05 part 4,4'-dihydroxybenzophenone
0.4 part resorcinol monobenzoate
1.0 part benzoyl peroxide The ingredients are thoroughly mixed, cast into a mold and heated at about 180° F. for about 30 minutes.

The stabilizer of the present invention can be used in the polyester resins in amounts of from about 0.01% to about 10.0% based on the weight of the polyester, however in the preferred embodiment of our invention we use about 0.5% stabilizer based on the weight of the resin.

Polyester resins containing the present stabilizer may or may not be modified with extenders, fillers, other polymers, plasticizers, lubricants, catalysts, accelerators, curing agents, pigments, dyes, surface active agents, antioxidants, inhibitors or related materials the use of which is prompted by processing application and appearance.

Other modes of applying the principle of the invention may be employed, change being made as regards the details described, provided the feature stated in any of the following claims or the equivalent of such be employed.

We, therefore, particularly point out and distinctly claim as our invention:

1. A composition of matter comprising an unsaturated polyester of a glycol and dicarboxylic acid at least a part of which is selected from the group consisting of maleic, fumaric and endomethylene tetrahydrophthalic acids and from about 0.01% to about 10% of an agent for inhibiting degradation of the polyester by ultra-violet light said agent comprising from about 10% to about 90% resorcinol monobenzoate and from about 90% to about 10% of a material selected from the group consisting of 2,4-dihydroxybenzophenone, 2-hydroxy-4-methoxybenzophenone, 2,2'-dihydroxybenzophenone and 4,4'-dihydroxybenzophenone.

2. A composition of matter comprising an unsaturated polyester of a glycol and dicarboxylic acid at least a part of which is selected from the group consisting of maleic, fumaric and endomethylene tetrahydrophthalic acids and from about 0.01% to about 10% of a stabilizer, said stabilizer comprising from about 10% to about 90% resorcinol monobenzoate and from about 90% to about 10% 2,4-dihydroxybenzophenone.

3. A composition of matter comprising an unsaturated polyester of a glycol and dicarboxylic acid at least a part of which is selected from the group consisting of maleic, fumaric and endomethylene tetrahydrophthalic acids and from about 0.01% to about 10% of a stabilizer, said stabilizer comprising from about 10% to about 90% resorcinol monobenzoate and from about 90% to about 10% 2-hydroxy-4-methoxybenzophenone.

4. A composition of matter comprising an unsaturated polyester of a glycol and dicarboxylic acid at least a part of which is selected from the group consisting of maleic, fumaric and endomethylene tetrahydrophthalic acids and from about 0.01% to about 10% of a stabilizer, said stabilizer comprising from about 10% to about 90% resorcinol monobenzoate and from about 90% to about 10% 2,2-dihydroxybenzophenone.

5. A composition of matter comprising an unsaturated polyester of a glycol and dicarboxylic acid at least a part of which is selected from the group consisting of maleic, fumaric and endomethylene tetrahydrophthalic acids and from about 0.01% to about 10% of a stabilizer, said stabilizer comprising from about 10% to about 90% resorcinol monobenzoate and from about 90% to about 10% 4,4'-dihydroxybenzophenone.

No references cited.